United States Patent
Macchiarulo et al.

[11] Patent Number: 5,536,213
[45] Date of Patent: Jul. 16, 1996

[54] TOOTHED BELT TRANSMISSION FOR DRIVING DYNAMIC BALANCING SHAFTS IN ENDOTHERMIC ENGINES

[75] Inventors: Vincenzo Macchiarulo, Pescara; Carlo Fiordaliso, Citia's Angelo; Franco Cipollone, Chieti; Tommaso Di Giacomo, Guardiagrele, all of Italy

[73] Assignee: Dayco PTI S.p.A., Chieti Scalo, Italy

[21] Appl. No.: 343,913

[22] Filed: Nov. 17, 1994

[30] Foreign Application Priority Data

Nov. 26, 1993 [IT] Italy ................... MI93A2497

[51] Int. Cl.⁶ .................................................. F16G 1/28
[52] U.S. Cl. .................................. 474/205; 474/238
[58] Field of Search .......................... 474/205, 237–238, 474/265, 249–257

[56] References Cited

U.S. PATENT DOCUMENTS

| | | |
|---|---|---|
| 4,074,589 | 2/1978 | Nakamura et al. . |
| 4,125,036 | 11/1978 | Nakamura et al. . |
| 4,614,509 | 9/1986 | Tangorra et al. ............... 474/205 |
| 5,273,496 | 12/1993 | White, Jr. ....................... 474/238 |

FOREIGN PATENT DOCUMENTS

| | | |
|---|---|---|
| 0368099 | 5/1990 | European Pat. Off. . |
| 0461865 | 12/1991 | European Pat. Off. . |
| 3322769 | 1/1985 | Germany . |

OTHER PUBLICATIONS

Noise Control Engineering Journal, vol. 39, No. 2, Sep. 1992, U.S.A., pp. 77–89, Chee-chiu Joseph Wong, "Timing Belt Noise of Office Machines II".

Hydraulic Penumatic Mechanical Power, vol. 31, No. 367, Jul. 1985, Morden, Surrey, Great Britain, pp. 175–177, G. Heinz, "Timing belts —an allround transmission element".

*Primary Examiner*—Michael Powell Buiz
*Attorney, Agent, or Firm*—Watson Cole Stevens Davis

[57] ABSTRACT

In an endothermic engine there are two dynamic balancing shafts driven in rotation in respectively opposite directions, at a speed twice that of the rate of rotation of the crankshaft. The dynamic balancing shafts are driven by a toothed belt transmission (1), comprising a driving pulley (2) keyed on the crankshaft, two driven pulleys (3, 4) keyed on the balancing shafts and a tensioning pulley (5) rotatably engaged with the base. The pulleys (2, 3, 4, 5) are connected together by a belt (6) having an internal (9) and external (10) toothing with a toothing pitch (P) equal to 7.5 mm, and provided with a reinforcing structure (7) formed by glass fibre cords (8) having a diameter equal to 0.9 mm.

7 Claims, 4 Drawing Sheets

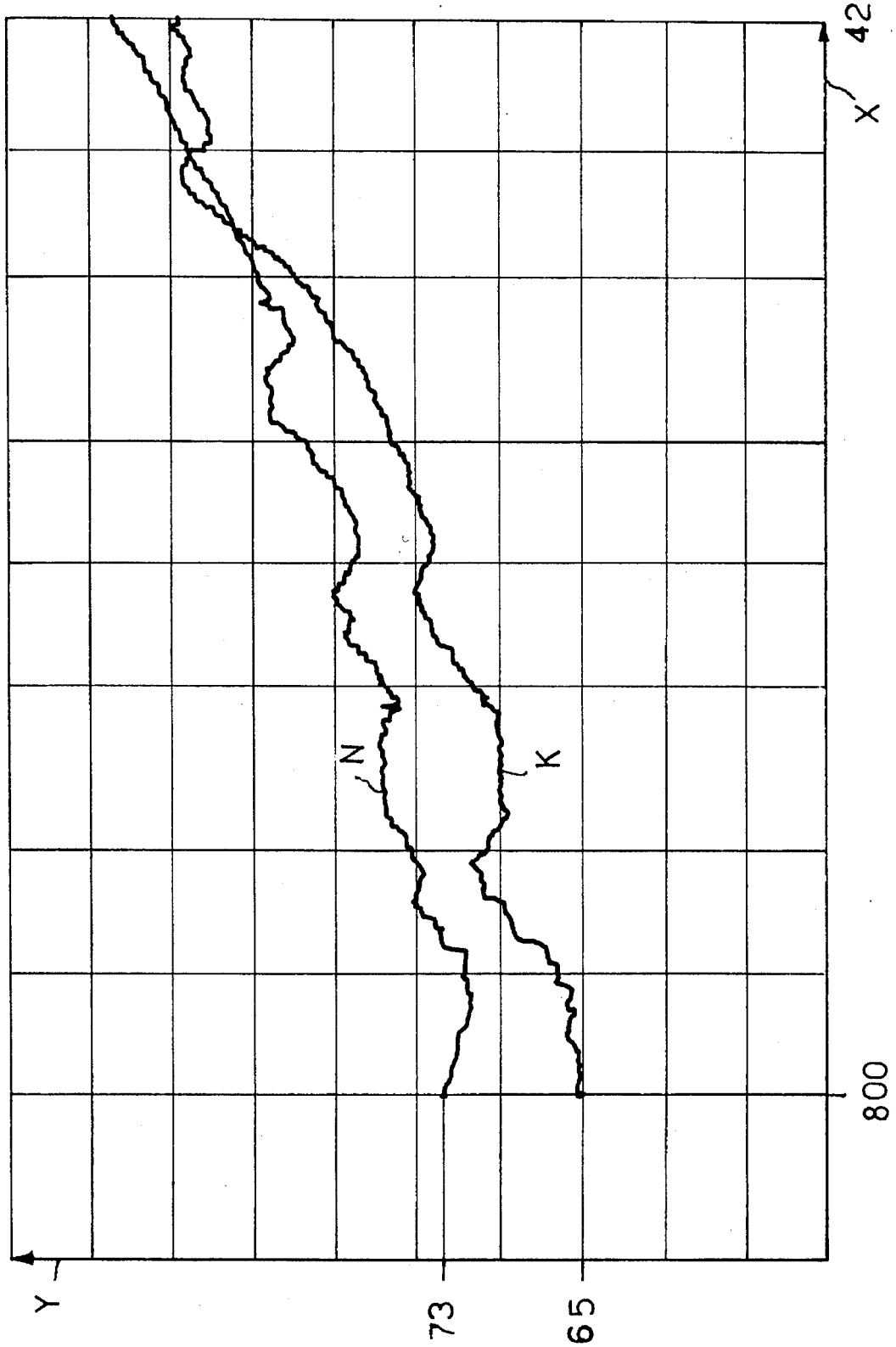

TOOTHED BELT TRANSMISSION FOR DRIVING DYNAMIC BALANCING SHAFTS IN ENDOTHERMIC ENGINES

BACKGROUND OF THE INVENTION

The present invention relates to a toothed belt transmission for driving dynamic balancing shafts in endothermic engines, of the type comprising: a driving pulley keyed on a crankshaft rotatably supported by a base of an endothermic engine; a first and a second driven pulley keyed on respective dynamic balancing shafts rotatably engaged with the base, said driven pulleys each having a pitch diameter equal to ½ of a pitch diameter of the driving pulley; a toothed tensioning pulley rotatably engaged with the base. A toothed transmission belt extends along a closed line extending partially over said driving, driven and tensioning pulleys, said transmission belt having a reinforcing structure formed by a plurality of cords lying consecutively side by side, incorporated in at least one layer of elastomer material in which there are defined a set of internal teeth that engages with respective toothings of the driving pulley, of the first driven pulley and of the tensioning pulley. The belt also has an external toothing that engages with a respective toothing of the second driven pulley.

Both toothings are preferably coated with at least one reinforcing layer of textile material.

As is known, many endothermic engines used in motor cars or motor cycles are provided with a pair of dynamic balancing shafts rotatably housed in the base and constituting essentially respective eccentric masses that, by rotating in respective opposite directions and at twice the speed with respect to the rate of rotation of the crankshaft, are used to eliminate vibrations due to the forces of inertia, as well as to other perturbing torques, that are well known to be generated when the engine is in operation.

To this end, the dynamic balancing shafts are driven by a belt transmission that essentially comprises a toothed belt extending, along a closed line, between respective toothed pulleys.

In particular, there is a driving pulley keyed on the crankshaft, a first and a second driven pulley respectively keyed on the dynamic balancing shafts, as well as a toothed tensioning pulley rotatably engaged with the base of the engine.

Since the dynamic balancing shafts must rotate at a rate equal to twice that of the crankshaft, the driven pulleys have a pitch diameter, and number of teeth, equal to half those of the driving pulley.

The toothed belt essentially has a reinforcing structure such as an insert formed by at least one cord for example of glass fibre helically wound in the usual manner to form a plurality of turns lying consecutively side by side along the extension of the width of the belt; such turns are incorporated in a layer of elastomer material defining, on respectively opposite parts, a toothing internal and a toothing external to the peripheral extension of the belt. Under operating conditions, the belt's internal toothing engages with the toothings of the driving pulley, of the tensioning pulley and of the first driven pulley, so that the dynamic balancing shaft associated with the latter is made to rotate in the same direction as the direction of rotation of the crankshaft. In turn, the external toothing of the belt engages with the toothing of the second driven pulley, so that the dynamic balancing shaft associated with the latter is made to rotate in the opposite direction to the direction of rotation of the crankshaft.

In the toothed belts currently used in transmissions for driving dynamic balancing shafts, the teeth constituting the individual toothings are placed consecutively side by side along a pitch of 9.525 mm, that is ⅜ of an inch.

The state of the art is standardized on this pitch size.

It has been found that current belt transmissions originate a considerable noise in operation the intensity of which is in many cases found to be unacceptable.

SUMMARY OF THE INVENTION

According to the present invention, it has been found that by reducing the pitch of the belt toothing and, therefore, that of the toothings of the pulleys, as well by possibly reducing in proportion the dimensions of other components of the belt, it is possible to attain a more than appreciable reduction in the noise during operation of the belt, without jeopardizing its characteristics of length of life and reliability even if pulleys are used whose diameters are smaller than the minimum allowed by the known art.

In particular, the invention relates to a toothed belt transmission in elastomer and similar materials for driving dynamic balancing shafts in endothermic engines, comprising:

a driving pulley with pitch diameter (D) and number of teeth (z) keyed on a crankshaft rotatably supported by a base of an endothermic engine;

a first and a second driven pulley keyed on respective dynamic balancing shafts rotatably engaged with the base, said driven pulleys each having a pitch diameter equal to ½ of the pitch diameter of the driving pulley;

a toothed tensioning pulley rotatably engaged with the base;

a toothed transmission belt extending along a closed line that is extending over said driving, driven and tensioning pulleys, said transmission belt having a reinforcing structure formed by at least one helically wound cord to form a plurality of turns lying consecutively side by side, incorporated in at least one layer of elastomer material in which there are defined an internal toothing with pitch (P) that engages with respective toothings of the driving pulley, of the first driven pulley and of the tensioning pulley, and an external toothing with pitch (P) that engages with respective toothings of the second driven pulley, both these toothings being coated with textile materials, characterized in that the internal and external toothings of the toothed belt are defined by respective teeth reciprocally spaced with a pitch (P) ranging from 6.5 mm to 8.5 mm.

In a particular preferential embodiment the toothed belt transmission is characterized in that, for a driving pulley caused to rotate at a number of revolutions ranging from 800 to 7500 revolutions per minute, the value of the diameter (D) of the driving pulley in relation to the number of teeth (z) and to the pitch (P) is such that the peripheral speed at which the teeth of the belt come to engage with the teeth of the driving pulley when the engine is idling determines a value of noise that is at least 3 decibel below that which would be obtained with a belt and driving pulley with pitch (P) equal to 9.525 mm and pitch diameter (D) of the driving pulley of 115.2 mm.

Preferably in this embodiment the pitch diameter of the driving pulley ranges from 70.3 to 105.04 mm.

In an embodiment with a pitch of 7.5 mm the pitch diameter of the driving pulley can range from 76.39 mm to 105.4 mm, with pitch 6.5 mm from 70.3 mm to 86.9 mm.

In a further particular embodiment the toothed belt transmission is characterized in that, for a driving pulley caused to rotate at a rate ranging from 800 to 4600 revolutions per minute, the value of the diameter (D) of the driving pulley in relation to the number of teeth (z) and of the pitch (P) is such that the peripheral speed at which the teeth of the belt come to engage with the teeth of the driving pulley when the engine is idling determines a value of noise that is at least 3 decibel below that which would be obtained with a belt and driving pulley with pitch (P) equal to 9.525 mm and pitch diameter (D) of the driving pulley of 139.4 mm.

Preferably the diameter (D) of the driving pulley with a number of revolutions per minute from 800 to 4600 ranges from 70.3 to 124.05 mm.

According to the mentioned solutions the pitch (P) of the teeth is preferably equal to 7.5 mm.

In addition, said inextensible cord is made of glass fibre, formed by eleven strands twisted at eighty twists per meter and each strand is in turn formed by three elementary wires twisted one over the other.

Said cord has a diameter equal to or less than 1.05 mm, prefarably ranging from 0.6 to 1 mm and even more preferably equal to 0.9 mm.

For a belt with a width of 15 mm the cord has in the belt a helical winding with a number of turns that can range from 22 to 13 in relation to the values of the abovementioned diameters.

For belts with different widths, the cord can have turns distributed with the same density per centimeter of width.

Still according to the invention the transversal profile of each tooth of the belt has two apexes between which there is interposed a recess symmetrically arranged with respect to the centre line of the tooth, from said apexes there extending respective flanks of the tooth, conformed according to curved arcs, for example arcs of a circle, of an ellipse, of a hyperbola, of a parabola arranged symmetrically. Each of said flanks extends preferably according to an arc of a parabola having the origin at one of said apexes and defined inside two parabolic curves having the expression, respectively:

$y=0.9426x^2$ and $y=1.68x^2$.

Preferably the arc of the parabola is defined by the expression:
$y=1.43755x^2$.

The tangents to the flanks of the teeth, in the proximity of the latter's base, define a pressure angle ranging from 28 to 44, preferably equal to 34°.

Each of said teeth has a root, identified by the intersection between the tangents to terminal points of the flanks and the lying plane of root portions of the respective toothing, whose width ranges from 3.25 to 5.8 mm, preferably equal to 4.95 mm.

Still according to the invention, each tooth has a height ranging from 2 to 3 mm, preferably equal to 2.53 mm.

The ratio between the width of the root of the tooth and the toothing pitch ranges from 0.50 to 0.68, preferably equal to 0.66.

Still according to the invention at a rate of rotation of 800 revolutions per minute of the driving pulley there is a noise of less than 73 db.

BRIEF DESCRIPTION OF DRAWING

Further features and advantages will appear more clearly from a detailed description of a preferred, but non-exclusive, embodiment, of a toothed belt transmission for driving dynamic balancing shafts in endothermic engines, according to the present invention. Such description will be made hereinafter with reference to the enclosed drawings, provided only as indicative and thus non-limiting examples, wherein:

FIG. 3 is a graph showing the variation in the noise of the belt transmission according to the invention, with the variation in the rate of operation of the engine, compared with the variation in noise observed on a belt transmission made according to the known art;

DETAILED DESCRIPTION OF A PREFERRED EMBODIMENT

Figure 1:
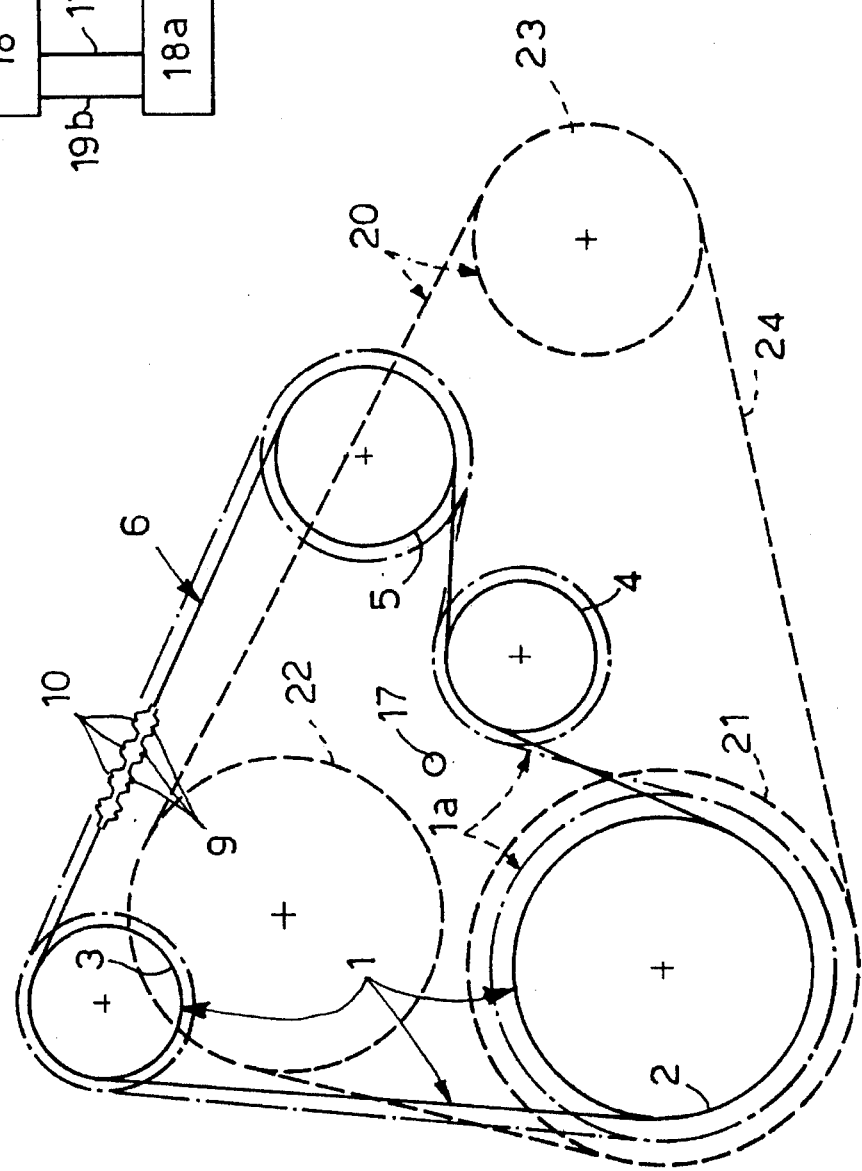
FIG. 1 illustrates schematically a toothed belt transmission according to the present invention, with which there is associated a schematic outline, for the purpose of comparison, of a toothed belt transmission according to the known art.

With particular reference to FIG. 1, numeral 1 generally refers to a belt transmission for driving dynamic balancing shafts in endothermic engines, according to the present invention.

In a known manner, the belt transmission 1 is arranged to be driven by a crankshaft rotatably supported on a base of an endothermic engine, to drive in rotation, in directions respectively opposite to each other and at twice the speed with respect to the speed of rotation of the crankshaft, a pair of dynamic balancing shafts rotatably engaged with the base itself.

Such crankshaft, dynamic balancing shafts and the endothermic engine as a whole have not been represented in the enclosed figures since they are themselves known and conventional.

The transmission 1 comprises a toothed driving pulley 2, with diameter (D) and number of teeth (z) keyed on the crankshaft, a first and a second driven pulley 3, 4 each keyed on one of the dynamic balancing shafts and having a number of teeth equal to half the number of teeth of the driving pulley 2, as well as at least one tensioning pulley 5 rotatably engaged with the base of the engine.

Figure 5:
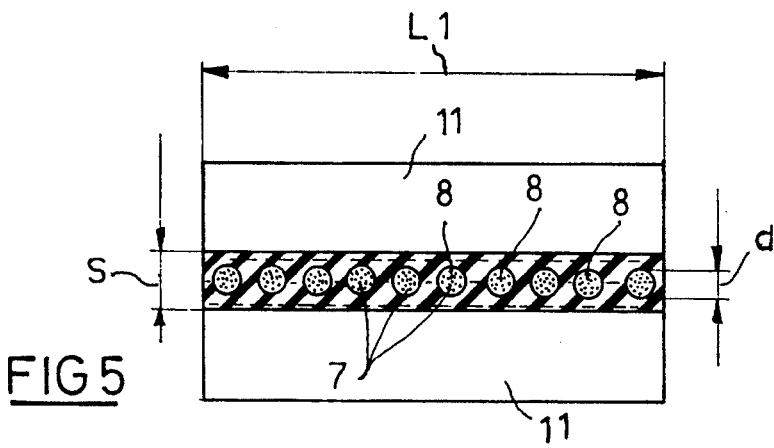
FIG. 5 shows, on an enlarged scale, a cross-section of the belt taken along the line V—V of FIG. 4.

With the driving pulley 2, the driven pulleys 3, 4 and transmission pulley 5 there is operationally associated a toothed transmission belt 6. The belt 6 is provided with a reinforcing structure insert 7 (FIG. 5) formed by at least one cord helically wound to form a plurality of turns 8, extending along the longitudinal extension of the belt itself and lying reciprocally side by side along the direction of the belt's width. The reinforcing structure insert is incorporated in at least one layer of elastomer material on which there are positioned, following one or more casting operations carried out conventionally during the manufacturing stage, an internal toothing 9 and an external toothing 10, each defined by a plurality of teeth 11 extending transversally to the belt 6 and lying consecutively side by side according to a predetermined toothing pitch.

Both toothings are preferentially coated with at least one layer of textile material.

As can be seen clearly from FIG. 1, the teeth 11 constituting the internal toothing 9 are used to engage with the respective toothings (not represented as they are known in themselves) of the driven pulley 2, of the tensioning pulley 5 and of the first driven pulley 3, so that the dynamic balancing shaft associated with the latter is driven in rotation in the same direction of rotation as the crankshaft, at a number of revolutions twice that of the latter.

The teeth 11 that define the external toothing 10, in turn, are used to engage with the toothing of the second driven pulley 4, so that the dynamic balancing shaft associated with the latter is also caused to rotate at a speed twice that of the crankshaft, but in the opposite direction.

According to the present invention, the teeth 11 that define the internal toothing 9 and the external toothing 10 of the belt 6 are reciprocally spaced according to a pitch "P" that is less than the pitch of 9.525 mm provided for according to the known art.

More in particular, the pitch "P" of the external toothing 10 and the internal toothing 9 ranges from 6.5 to 8.5 mm and is preferably equal to 7.5 mm.

Figure 4:
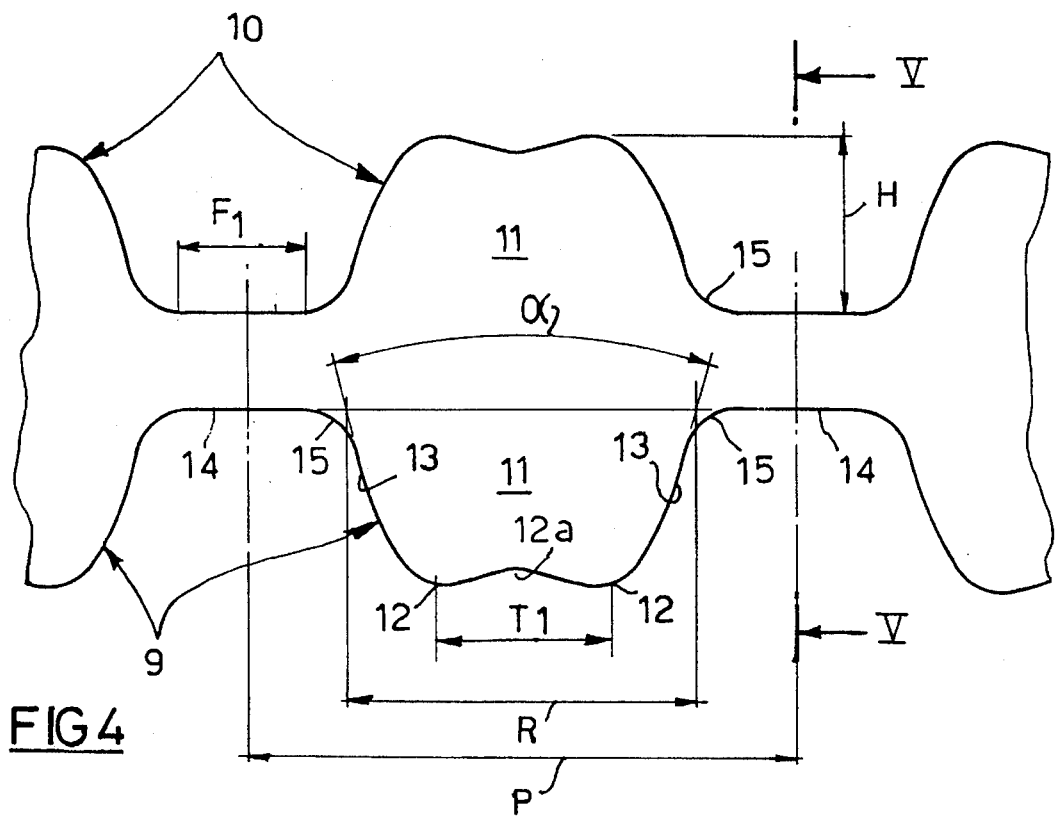
FIG. 4 shows on an enlarged scale and in a cut off elevational a belt used in the transmission according to the present invention.

With the reduction in the pitch "P" of the toothings 9, 10 there is a change of further dimensional parameters of the cross-section of the toothings themselves. FIG. 4 indicates some of the main dimensional parameters mentioned above. With reference to that figure, the overall height "H" of each tooth 11 ranges from 2 to 3 mm, preferably equal to 2.53 mm. To advantage, such height "H" of the tooth 11 is slightly greater than the depth of the corresponding recesses arranged in the toothings of the driving pulley 2, the driven pulleys 3, 4 and the tensioning pulley 5.

Each tooth 11, has a head portion defined by two apexes 12 between which there is a recess 12a symmetrically arranged with respect to the tooth's centre line. The distance "T" between the apexes 12 ranges from 0.321 and 3.111 mmm, preferably equal to 2.26 mm. In the present solution the H/T ratio ranges from 0.65 to 6.71, preferably such ratio is equal to 1.116.

Each tooth 11 is also provided with flanks 13 advantageously conformed according to arcs of a parabola arranged symmetrically, having the origin at the apexes 12 and extending in the direction of the reinforcing structure 7 until they connect with respective root portions 14 of the corresponding toothing by means of connecting sections 15 in the form of arcs of a circle. More in detail, each of the flanks 13 extends according to the following equation:

$$y = 1.43755 x^2.$$

The flanks 13 of the tooth 11, in the proximity of the latter's base, have an angle "α", defined by the tangents to the flanks themselves at their terminal points connecting with the connecting sections 15 whose value ranges from 28 to 44, preferably equal to 34°.

The intersection between the tangents to the flanks 13 and the lying plane of the root portions 14 defines a so-called "root" of the tooth 11 whose width "R" ranges from 3.25 to 5.8 mm, preferably equal to 4.95 mm. To advantage, the ratio between the dimension of the root "R" and the pitch "P" of the toothing ranges from 0.5 to 0.68, and is preferably equal to 0.66.

The width "F" of each root portion 14, taken between terminal points of the connecting sections 15 of two continguous teeth 11, ranges from 0.99 and 2.47 mm, preferably equal to 1.14 mm.

At each root portion 14 the belt 6 also has a so-called web thickness "S" (FIG. 5) ranging from 0.9 to 1.6 mm and preferably equal to 1.2.

Still according to the present invention, the cords 8 forming the reinforcing structure 7 are made of glass fibre or other material and have a diameter "d" ranging from 0.6 to 1.05 mm, preferably a diameter equal to 0.9 mm, and in any case less than the diameters of 1.25 mm commonly used in the known art.

More in detail, each of the cords 8 is preferably of the type 3×11. In this solution the cord comprises 11 strands twisted at eighty twists per meter and each strand is in turn formed by three elementary wires twisted one over the other.

The elastomer material incorporating the resistant insert 7 and forming the teeth 11 is preferably constituted by a hydrogenated nitrilic mixture having a hardness equal to 71 Shore A.

Other alternative materials are those already known used in transmission belts.

By means of a known and conventional process, both on the external toothing 10 and on the internal toothing 9 of the belt 6, one or more textile coating materials (not shown) have been applied, by means of which there is the physical contact on the surfaces of the toothings of the respective pulleys 2, 3, 4, 5. In a preferential solution each of these textile materials, having a thickness equal to 0.3 mm, is accomplished with a material of the type "nylon 6.6" with a weight of 330 g/m$^2$, and is coated with a hydrogenated nitrilic mixture and isocyanate.

The reduction of the pitch "P" of the toothings 9, 10 of the toothed belt 6 involves an appreciable reduction in the diameter of the driving pulley 2, of the driven pulleys 3, 4 and of the tensioning pulley 5, at an equal number of teeth in them, with respect to the embodiments according to the known art. In fact, for the teeth of the pulleys 2, 3, 4, 5 to engage correctly with the teeth 11 arranged on the toothings 9, 10 with a reduced pitch "P", they shall have to be distributed according to a circumferential extension that is smaller than that on a pulley that can be associated with a transmission accomplished according to the known art.

The reduction in the diameter of the pulleys 2, 3, 4, 5 can be seen easily by comparing the outline of the abovementioned transmission 1, represented by continuous lines in FIG. 1, with the outline of a corresponding transmission accomplished according to the known art, indicated with a dashed and dotted line in the same figure.

It has been found that due to the reduction of the pulleys and of the speed there is an appreciable reduction in the noise of the transmission 1 with respect to the known art. This result may be attributed to the fact that the drop in the peripheral speed of the pulleys and of the belt's movement involves an attenuation in the shocks, and in the consequent noise, due to the interferences between the teeth 11 of the belt 6 and the teeth of the pulleys 2, 3, 4, 5 at the instant when they engage with one another.

It has also been found that the belts made according to the present invention have features of long life, reliability and resistance equal to, if not higher than, those encountered on corresponding belts made according to the known art.

These results are altogether unexpected in consideration of the fact that the adoption of smaller pulleys involves larger bending stresses on the belt and, besides, an increase in the traction force applied along it for the same torque transmission. All the more reason for the features of resistance, long life and reliability, obtained with the invention, to be surprising in consideration of the fact that, in the light of the belt's exacting operational conditions, the dimensional reduction of the cords 8 constituting the reinforcing structure 7 is in sharp contrast with the criteria of calculation and sizing usually adopted in the known art. In the light of the larger bending and traction stresses imposed upon the belt, current design criteria would in fact suggest an increase in the diameter of such cords, so as to increase their resistance to traction, and not a decrease as provided for in the abovementioned transmission.

According to the invention, in sum, it has been perceived that the reduction in the diameter of the cords 8, while determining a drop in the resistance to traction, it increases their flexibility and, thus, their ability to adapt to the curvature of the respective pulleys with bending stresses that are far lower than those involved in the known belts. In other words, the rise in the stresses on the belt and the drop in the resistance to traction of the cords are more than compensated for by the enhanced capacity exhibited by the cords themselves, and by the belt as a whole, to assume accentuated curvatures over the pulleys, and in particular over the driven pulleys 3, 4, without undergoing excessive internal bending forces.

Practical tests have amply demonstrated the validity of the considerations made and the advantages brought by the invention to the state of the art.

For the sake of completeness, tests of noise and long life are described below so as to compare the qualitative characteristics of the transmission accomplished according to the invention with an equivalent transmission accomplished according to the known art.

Figure 2:
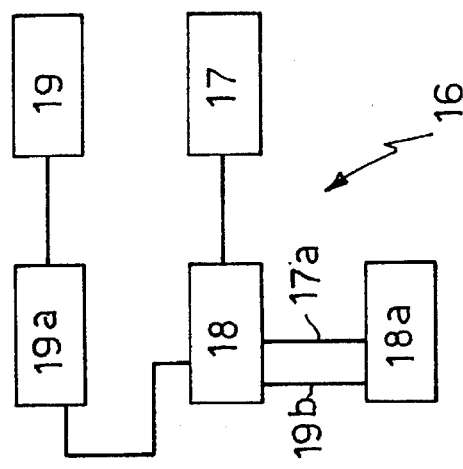
FIG. 2 is a block diagramme of an electronic device used to test the noise of the transmission at different rates of operation of the engine.

In a noise test, a belt transmission accomplished according to the above specifications with reference to the present invention has been associated with a four-stroke endothermic engine having four in-line cylinders of 1800 cc, to which a noise metering device was associated, indicated as a whole by numeral 16 in FIG. 2, to measure the noisiness emitted by the transmission itself under the engine's different operating speeds. The engine was mounted on a test bed with no cover housing.

In the tested transmission, the driving pulley, along its circumferential extension, has a number of teeth equal to 42, and a pitch diameter substantially equal to 100.3 mm. Each of the driven pulleys in turn has a number of teeth equal to 21, distributed along a pitch diameter substantially equal to 50.1 mm. The tensioning pulley has 24 teeth, and has a pitch diameter substantially equal to 57.3 mm.

The belt, provided overall with 118 teeth on the respective external and internal toothings, has an overall extension substantially equal to 885 mm and a width "L" (FIG. 5) equal to 15 min.

The cord is of the type 3×11, it has a diameter of 0.9 mm and is wound with 11 adjacent turns.

The angle α is equal to 34 degrees.

As can be seen from FIG. 2, the noise metering circuit 16 associated with the transmission comprises essentially a microphone 17 placed inside the extension of the toothed belt 6, as shown in FIG. 1, and connected to an amplifier 18 arranged to send a noise metering signal 17a, at an intensity proportional to the intensity of the noise picked up by the microphone 17, to a unit 18a recording the data detected during the test. Through a filter 19a, the amplifier 18 also receives the signal emitted by a tachymetric probe 19 associated with the driving pulley.

Together with the noise metering signal 17a, the amplifier thus sends a tachymetric signal 19b to the recording unit, proportional to the engine's rate of rotation.

The recorded noise metering and tachymetric signal 17a, 19b are represented in FIG. 3, from which it is possible to see, along the y-axis the sound intensity emitted by the transmission with the toothed belt as a function of the variation in the rate of rotation of the engine, shown along the x-axis.

As can be seen from the curve indicated with "K" in that graph, the noisiness of the transmission made according to the invention is substantially equal to 65 decibel when the engine is idling, that is to say, 800 revolutions per minute, and rises progressively with the increase in an engine's rate of rotation, until it reaches a peak of 90 decibel at 4200 revolutions per minute.

It should be noted that, for practical purposes, the most significant noise of the transmission 1 is the one that can be detected at low values of rates of rotation, since at high values of such rates the noise of the transmission, however high, is totally smothered by the noise produced by the operation of the other engine components, as well as, during the vehicle's operation, by the rolling noise of the times on the road surface and by aerodynamic noise.

A noise test similar to the above description has also been carried out, for comparison purposes, on the transmission made according to the known art, associated with the same engine and with the same noise metering device used in the test described earlier.

In this case the toothed belt, of the type marketed under the denomination "ISORAN DD—type RH" in the name of the same applicant, has a width equal to 15 mm, a tooth pitch equal to 9.525 mm, with a tooth height equal to 2.3 mm, an angle α equal to 40° and a web thickness equal to 1.42 mm. Such a belt has a reinforcing structure formed by a cord of the type 3×13 wound with 10 adjacent turns and having a diameter of 1.25 mm. The cord is made of glass fibre. The cord is incorporated in an elastomer material constituted by hydrogenated nitrilic mixture having a hardness equal to 71 Shore A.

The belt is provided, on the toothings T, with a double coating of textile material made of "nylon 6.6", having a weight of 230 g/m² for the external textile material and 120 g/m² for the internal textile material, coated with a hydrogenated nitrilic mixture and isocyanate, with a thickness of about 0.4 mm.

The driving, driven and tensioning pulleys, having a number of teeth equal to 38, 19 and 23, respectively, have pitch diameters equal to 115.2 mm, 57.6 mm and 69.73 mm, respectively.

The belt, provided with 97 teeth on each of the internal and external toothings has an overall extension equal to 923.925

The noise metering test carried out on the transmission made according to the known art has, as a result, is represented by the curve indicated by "N" in the graph of FIG. 3.

As can easily be seen by comparing the curve "N" with the curve "K", at the engine's idling speed, equal to 800 revolutions per minute, the transmission accomplished according to the known art has demonstrated a noise substantially equal to 73 decibel. It follows that the abovementioned transmission, at the most significant rate of rotation for practical purposes, obtains a reduction in noisiness of no less than 8 decibel with respect to the known art.

The belts used in the tests described earlier have also been subajected to respective long life tests, to compare the behaviour against the mechanical stresses of the belt accomplished according to the invention, compared with those accomplished according to the known art.

Figure 6:
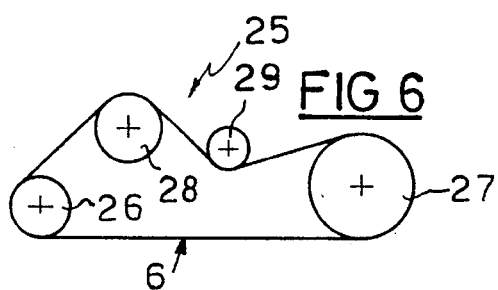
FIG. 6 is an outline of a device used to carry out fatigue tests on the belts used in the above transmission.

To this end, the belt 6 according to the invention has been associated with a test unit 25 outlined in FIG. 6, comprising a driving pulley 26 provided with 20 teeth, with a pitch diameter substantially equal to 47.7 mm, a driven pulley 27 having 40 teeth, with a pitch diameter substantially equal to 95.5 mm, a transmission pulley 28 having 25 teeth, with a pitch diameter equal to 59.68 mm, as well as a tensioning pulley 29 having 23 teeth, with a pitch diameter, equal to 54.90 mm.

The transmission thus accomplished was taken to a temperature of 110° C. and driven through the operation of the driving pulley 26 at 6000 revolutions per minute, applying on the driven pulley 27 a resistant torque of 15.7 Nm.

Under this test situation, the traction stress applied on the resistant insert 7 has been estimated at 658 N, and the life of the belt 6 was 220 h.

The same test was carried out on the belt made according to the known art, adopting a driving pulley 26 provided with 19 teeth, with a pitch diameter equal to 57.6 mm, a driven pulley 27 having 38 teeth, with a pitch diameter equal to 115.2 mm, a transmission pulley 28 having 21 teeth, with a diameter equal to 63.67 mm, as well as a tensioning pulley 29 having 19 teeth, with a pitch diameter equal to 57.6 mm.

In this case again, the transmission has been driven at 110° C. of temperature, causing the driving pulley 26 to rotate at a speed of 6000 revolutions per minute, and applying to the driving pulley 27 a resistant torque of 17.5 Nm.

In this case the belt, with a tension on the resistant insert estimated to be equal to 606 N, had a life of 150 h.

From the comparison of the figures given by the two duration tests, it is shown that the belt 6 made according to the invention, although it had a reinforcing structure 7 with cords 8 of reduced dimensions and was subjected to a higher traction force due to the smaller diameter of the pulleys, with respect to the known art, has exhibited better qualities of resistance and reliability. This demonstrates that the presumed weakening of the cords 8 having a reduced cross-section and the increase of the traction force, for an equal torque transmitted, consequent upon the reduction in the diameter of the pulleys, are amply compensated by the fact that the resistant insert 7, precisely by virtue of its reduced thickness, can bend easily along the winding arc of the belt on the respective pulleys, without being subjected to high internal stresses.

Together with the reduction in the noise of the transmission, an unexpected improvement in the reliability of the transmission itself has thus been attained making reductions on the dimensional parameters of the belt, instead of making dimensional increases on the same as one would have been led to think in the known art.

In a further test using the apparatus of FIG. 2 and a high-capacity four-cylinder Diesel engine a belt according to the invention having a pitch of 7.5 mm has been compared with a belt of the state of the art marketed with the code number RPP and a pitch of 9.525.

Both belts have the same width as mentioned in the earlier test.

The belt of the invention corresponds to that of the earlier test with the difference of an extension equal to 123 teeth.

The cord is again of the type 3×11 having a diameter of 0.9 mm.

The driving, driven and tensioning pulleys have a number of teeth equal to 42, 21 and 26, respectively.

The belt of the state of the art has 106 teeth, an angle a equal to 32°, a height of 3.30 mm, a glass fibre cord with a diameter of 1.25 mm, of the type 3×13 wound so as to form 10 adjacent turns.

The driving, driven and tensioning pulleys have a number of teeth equal to 46, 23 and 23, respectively.

Figure 7:
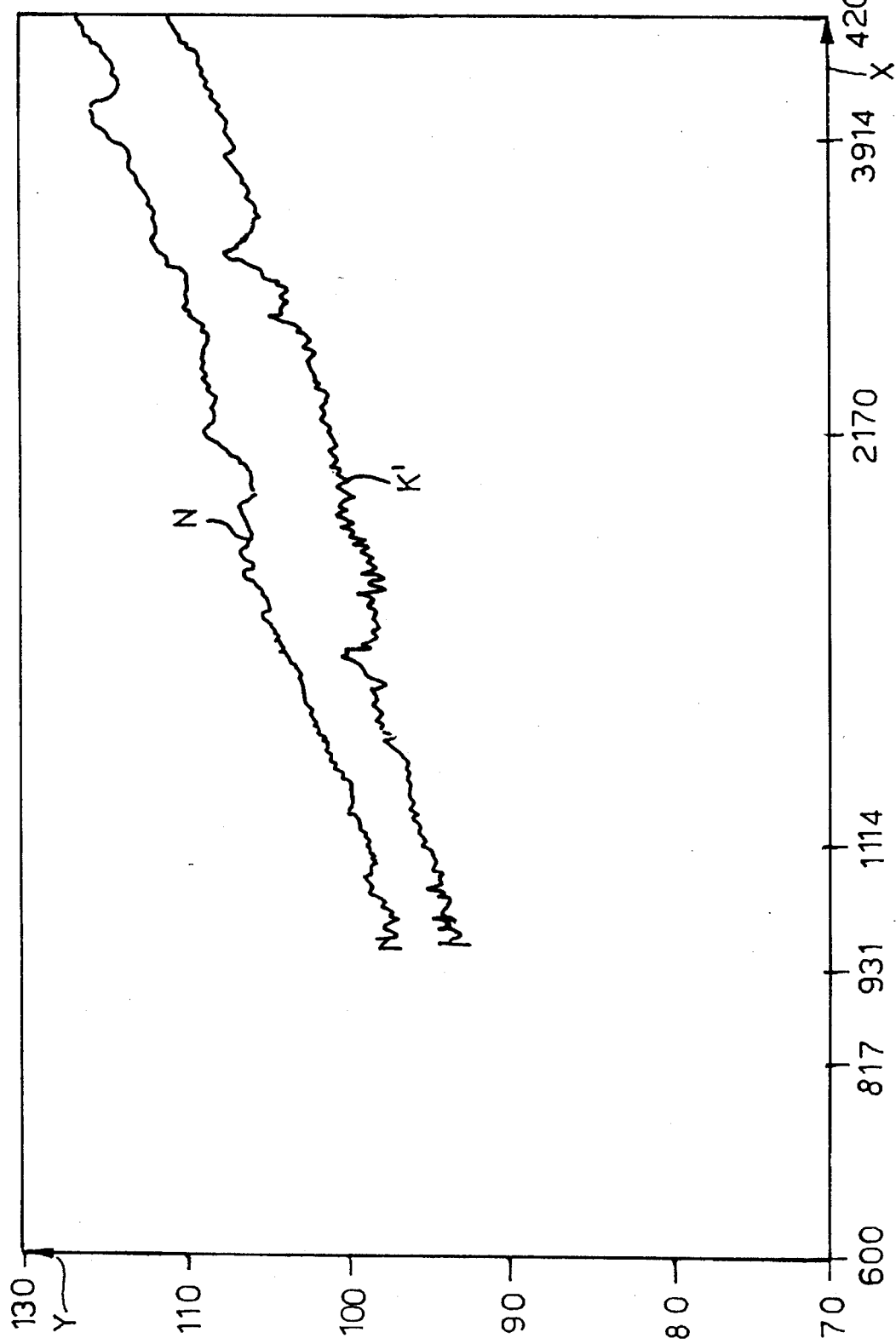
FIG. 7 is a graph showing the variation in the noise of the belt transmission according to an embodiment of the invention, with the variation in the rate of operation of the engine, compared with the variation in noise observed on a belt transmission made according to the known art.

The reduction in the noise of the belt according to the invention (curve k'), with respect to that of the known one (curve N') is highlighted in FIG. 7 right from the level of idling speed.

In practice the belt according to the invention exhibits a reduction in noise lower by at least 3 decibel with respect to the belt to which it has been compared.

Naturally, the invention conceived in this way may have numerous changes and variants, all falling within the scope of the inventive concept that characterizes it.

We claim:

1. Toothed transmission belt for driving dynamic balancing shafts in endothermic engines, comprising:

a reinforcing structure formed by at least one cord helically wound to form a plurality of turns lying consecutively side by side, incorporated in at least one layer of elastomer material in which there are defined an internal toothing and an external toothing with a first pitch; said internal toothing being arranged to engage, under operational conditions, with:

(a) respective toothings of a driving pulley with a pitch diameter and number of teeth, said driving pulley being keyed on a crankshaft rotatably supported by a base of an endothermic engine;

(b) a first driven pulley keyed on a respective dynamic balancing shaft and having a pitch diameter equal to ½ of the pitch diameter of the driving pulley and (c) a tensioning pulley rotatably engaged with the base;

said external toothing being arranged to engage, under operating conditions, with a respective toothing of a second driven pulley keyed on a respective dynamic balancing shaft and having a pitch diameter equal to ½ of the pitch diameter of the driving pulley the arrangement being such that the internal and external toothings of the toothed belt are defined by respective teeth reciprocally spaced with a pitch ranging from 6.5 mm to 8.5 mm.

2. Transmission belt according to claim 1 in which said toothing pitch is equal to 7.5 mm.

3. Transmission belt according to claim 1 in which each of said inextensible cords is made of glass fibre and has a diameter ranging from 0.6 to 1.05 mm.

4. Transmission belt according to claim 1 in which the transverse profile of each tooth of the toothed belt has two apexes between which there is interposed a recess symmetrically arranged with respect to a centre line of the tooth, and extending from said apexes there are respective flanks of the tooth which are conformed according to arcs of a symmetrically arranged parabola.

5. Transmission belt according to claim 4 in which each of said teeth has a root, identified by the intersection between tangents of terminal points of the flanks and a plane of the root portions of the respective toothing, whose width ranges from 3.25 to 5.8 mm.

6. Transmission belt according to claim 4 in which each tooth has a height ranging from 2 to 3 mm.

7. Transmission belt according to claim 5 in which a ratio between the width of the root of a tooth and the toothing pitch ranges from 0.50 to 0.68.

* * * * *